US010582140B2

(12) United States Patent
Hynecek

(10) Patent No.: US 10,582,140 B2
(45) Date of Patent: Mar. 3, 2020

(54) GLOBAL SHUTTER IMAGE SENSOR PIXELS HAVING IMPROVED SHUTTER EFFICIENCY

(71) Applicant: SEMICONDUCTOR COMPONENTS INDUSTRIES, LLC, Phoenix, AZ (US)

(72) Inventor: Jaroslav Hynecek, Allen, TX (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 162 days.

(21) Appl. No.: 15/795,718

(22) Filed: Oct. 27, 2017

(65) Prior Publication Data

US 2018/0048841 A1 Feb. 15, 2018

Related U.S. Application Data

(63) Continuation of application No. 14/554,914, filed on Nov. 26, 2014, now Pat. No. 9,832,407.

(51) Int. Cl.
*H04N 5/363* (2011.01)
*H04N 5/3745* (2011.01)

(52) U.S. Cl.
CPC ......... *H04N 5/37452* (2013.01); *H04N 5/363* (2013.01)

(58) Field of Classification Search
CPC ..................... H04N 5/363; H01L 27/14609
See application file for complete search history.

(56) References Cited

U.S. PATENT DOCUMENTS

| 5,625,210 A | 4/1997 | Lee et al. |
| 6,657,665 B1 | 12/2003 | Guidash |
| 7,277,129 B1 * | 10/2007 | Lee .................. H04N 5/357 |
| | | 250/208.1 |
| 8,535,996 B2 | 9/2013 | Shaheen et al. |

(Continued)

FOREIGN PATENT DOCUMENTS

KR    10-2011-0062981    6/2011

OTHER PUBLICATIONS

Hynecek et al., U.S. Appl. No. 13/086,363, filed Apr. 13, 2011.

(Continued)

*Primary Examiner* — Thanh Luu
(74) *Attorney, Agent, or Firm* — Treyz Law Group, P.C.; Michael H. Lyons; David K. Cole

(57) ABSTRACT

An image sensor may be provided with an array of image sensor pixels formed on a substrate having front and back surfaces. Each pixel may have a photodiode that receives light through the back surface, a floating diffusion node, a charge transfer gate, and first and second reset transistor gates. A source follower transistor may have a gate coupled to the floating diffusion node and a source coupled to an addressing transistor. The pixel may be coupled to a column feedback amplifier through the addressing transistor and a column feedback reset path. The amplifier may provide a kTC-reset noise compensation voltage to the reset transistors for storage on a holding capacitor coupled between the floating diffusion and a drain terminal of the source follower. The floating diffusion may be bounded at the front surface by the transfer gate, the reset gate, and p-type doped regions.

20 Claims, 4 Drawing Sheets

(56) References Cited

U.S. PATENT DOCUMENTS

| | | |
|---|---|---|
| 2005/0040320 A1* | 2/2005 | Lule .................. H01L 27/14609 250/214 R |
| 2007/0262238 A1 | 3/2007 | Takashima et al. |
| 2009/0201400 A1 | 8/2009 | Zhang et al. |
| 2010/0276574 A1 | 11/2010 | Manabe |
| 2012/0273653 A1 | 11/2012 | Hynecek |
| 2012/0273654 A1 | 11/2012 | Hynecek et al. |
| 2013/0153973 A1 | 6/2013 | Hynecek |
| 2014/0077062 A1 | 3/2014 | Hynecek |
| 2014/0077283 A1 | 3/2014 | Lenchenkov |
| 2014/0085523 A1 | 3/2014 | Hynecek |
| 2016/0150169 A1 | 5/2016 | Hynecek |
| 2016/0150174 A1 | 5/2016 | Hynecek |

OTHER PUBLICATIONS

Takayanagi et al., "A Four-Transistor Capacitive Feedback Reset Active Pixel and its Reset Noise Reduction Capability", Advances Technology Research Center.

Yasutomi et al., "A 2.7e- Temporal Noise 99.7% Shutter Efficiency 92dB Dynamic Range CMOS Image Sensor with Dual Global Shutter Pixels", International Solid-State Circuits Conference, Session 22, Image Sensors, 2010 IEEE, Feb. 10, 2010.

"Sony Develops Next-generation Back-Illuminated CMOS Image Sensor which Embodies the Continuous Evolution of the Camera", Sony Corp. Info, [online], Jan. 23, 2012. <http://www.sony.net/SonyInfo/News/Press/201201/12-009E/ >.

* cited by examiner

GLOBAL SHUTTER IMAGE SENSOR PIXELS HAVING IMPROVED SHUTTER EFFICIENCY

This application is a continuation of patent application Ser. No. 14/554,914, filed Nov. 26, 2014, which is hereby incorporated by reference herein in its entirety. This application claims the benefit of and claims priority to patent application Ser. No. 14/554,914, filed Nov. 26, 2014.

BACKGROUND

This relates to solid-state image sensor arrays and, more specifically, to image sensors with small size pixels that are illuminated from the back side of a pixel substrate. Small pixel sizes reduce the cost of manufacturing image sensor arrays, but it is important not to sacrifice image sensor performance when pixel size is reduced.

Typical complementary metal-oxide-semiconductor (CMOS) image sensors sense light by converting impinging photons into electrons that are integrated (collected) in sensor pixels. Upon completion of each integration cycle, the collected charge is converted into voltage signals, which are supplied to corresponding output terminals associated with the image sensor. Typically, the charge-to-voltage conversion is performed directly within the pixels, and the resulting analog pixel voltage signals are transferred to the output terminals through various pixel addressing and scanning schemes. The analog voltage signal can sometimes be converted on-chip to a digital equivalent before being conveyed off-chip. Each pixel includes a buffer amplifier (i.e., source follower) that drives output sensing lines that are connected to the pixels via respective address transistors.

After the charge-to-voltage conversion is completed and after the resulting signals are transferred out from the pixels, the pixels are reset before a subsequent integration cycle begins. In pixels that include floating diffusions (FD) serving as the charge detection node, this reset operation is accomplished by momentarily turning on a reset transistor that connects the floating diffusion node to a voltage reference for draining (or removing) any charge transferred onto the FD node. However, removing charge from the floating diffusion node using the reset transistor generates thermal kTC-reset noise, as is well known in the art. This kTC reset noise must be removed using correlated double sampling (CDS) signal processing techniques in order to achieve desired low noise performance. Typical CMOS image sensors that utilize CDS require at least four transistors (4T) per pixel. An example of the 4T pixel circuit with a pinned photodiode can be found in Lee (U.S. Pat. No. 5,625,210), incorporated herein as a reference.

In modern CMOS sensor designs, the circuitry of several photodiodes is often shared. An example in which the circuitry of several photodiodes is shared can be found in Guidash (U.S. Pat. No. 6,657,665), incorporated herein as a reference. In some situations, four photodiodes located in neighboring rows and columns of a pixel array have shared circuitry. Such shared pixel circuitry results in an increased pixel density on the array relative to situations where the pixels do not share circuitry, while undesirably increasing the number of metal addressing lines used for conveying signals to/from the pixels, particularly when global shutter (GS) storage sites are included in pixels.

One primary disadvantage of conventional CMOS image sensors is that pixel scanning after charge has been accumulated in the pixels is performed in a sequential manner row-by-row. This generates exposure time skew, which is often observed as distortion in images of moving objects. Scanning the pixels row-by-row is referred to as operating the sensor in a "rolling shutter" mode, which resembles the action of a focal plane slit shutter found in conventional photographic film cameras. In most applications, however, it is preferable to expose all of the pixels of the array at the same time without exposure time skew to thereby eliminate distortion of moving objects in the image. This type of image sensor operation is referred to as "global shuttering" (GS) which resembles the operation of a mechanical iris shutter in conventional photographic film cameras. In order to implement this type of global shuttering, it is necessary to provide multiple charge storage sites in each sensor pixel.

After charge is integrated in photodiodes of the pixels when operating in a GS scheme, charge is transferred to pixel storage sites simultaneously in all of the pixels of the array, where charge can wait for scanning in a row-by-row fashion. The pixel scanning time skew is thus independent of the frame pixel exposure time. Examples of methods for incorporating multiple charge storage sites into the CMOS sensor pixels can be found in Yasutomi et al. (ISSCC Digest of Technical Papers, Feb. 10, 2010, pp. 398 and 399, entitled "A 2.7e Temporal Noise 99.7% Shutter Efficiency 92 dB Dynamic Range CMOS Image Sensor with Dual Global Shutter Pixels"), which is incorporated herein as a reference. The arrangement of Yasutomi et al. is a modification of the conventional Interline Transfer Charge Coupled Device (CCD) concept where charge from the pixel photodiodes is transferred first into vertical CCD registers located in the spaces between the pixels, and then from there charge is transferred in parallel fashion row-by-row into a serial register followed by a CCD charge transfer into a common single charge detection node and output amplifier. This application of the CCD charge transfer concept into CMOS sensors to implement global shuttering is shown in FIG. 1, where charge is stored in an additional pinned diode.

FIG. 1 shows a simplified circuit diagram of a pixel 100 in a CMOS sensor that has global shuttering capabilities. After charge integration is completed in first pinned photodiode 101, charge is transferred via charge transfer transistor 103 to second pinned diode 102. The transferred charge waits in diode 102 for scanning. The charge transfer from first diode 101 to second diode 102 is complete in a CCD fashion without generating kTC noise. It is also necessary that either second diode 102 has a higher pinning voltage than diode 101, or transfer gate 103 has a potential barrier and a potential well. Moreover, it is necessary that the second diode 102 is well shielded from impinging photons 115 (i.e., the photons used to generate charge at first diode 101) to prevent undesirable smear effects when objects in the imaged scene move. The light shielding effect is characterized in such image sensors by a parameter referred to as shutter efficiency.

Signal charge readout operations form second diode 102 proceeds in a conventional manner by first resetting floating diffusion (FD) node 104 to drain bias voltage Vdd by momentarily turning on reset transistor 106, followed by pulsing the gate of charge transfer transistor 105. This sequence can now proceed in a sequential order row-by-row through the array. The signal appearing on floating diffusion 104 is buffered by source follower transistor 107 that is addressed by row addressing transistor 108. The pulses to control transfer transistor gates 103 and 105, reset transistor 106, and addressing transistor 108 are supplied by row bus lines 111, 112, 113, and 114, respectively (i.e., coupled to row control circuitry in the image sensor). Bias voltage Vdd is supplied to the pixels by column Vdd line 109 and the signal output appears on the column output line 110. Using the pinned diodes for charge storage in this way is advantageous because the diodes of this type have relatively low dark current generation characteristics (high levels of dark current in the charge storage regions can add noise and generate undesirable shading effects in the image). However, second diode 102 consumes a significant amount of pixel area, thus increasing the size of the corresponding image sensor and, ultimately, its cost. Another disadvantage of the pinned photodiode storage approach is the higher pinning voltage necessary for second diode 102 relative to the pinning voltage for diode 101. This higher pinning voltage consumes a valuable allocated voltage swing that is determined by the maximum device operating voltage and results in reduction of charge storage capacity, and thus the dynamic range (DR) of the image sensor.

The above-noted problems in the design of global shuttered pixels can be partially overcome in Front Side Illumination (SFI) applications, where a light shield can be placed over second pinned charge storage diode 102 to prevent light leakage onto diode 102. However, such methods are counterproductive in Back Side Illumination (BSI) applications. In particular, a light shield placed on the back side of the sensor substrate in a BSI application is less efficient than in front side applications and limits the quantum efficiency (QE) of the sensor (a high quantum efficiency is a primary purpose for using back side illumination in small size pixel sensors). Therefore, it is not viable to use second pinned diode 102 for charge storage in a BSI application.

It would therefore be desirable to be able to provide improved back side illuminated image sensor pixels with global shutter capabilities.

DETAILED DESCRIPTION

Figure 2:
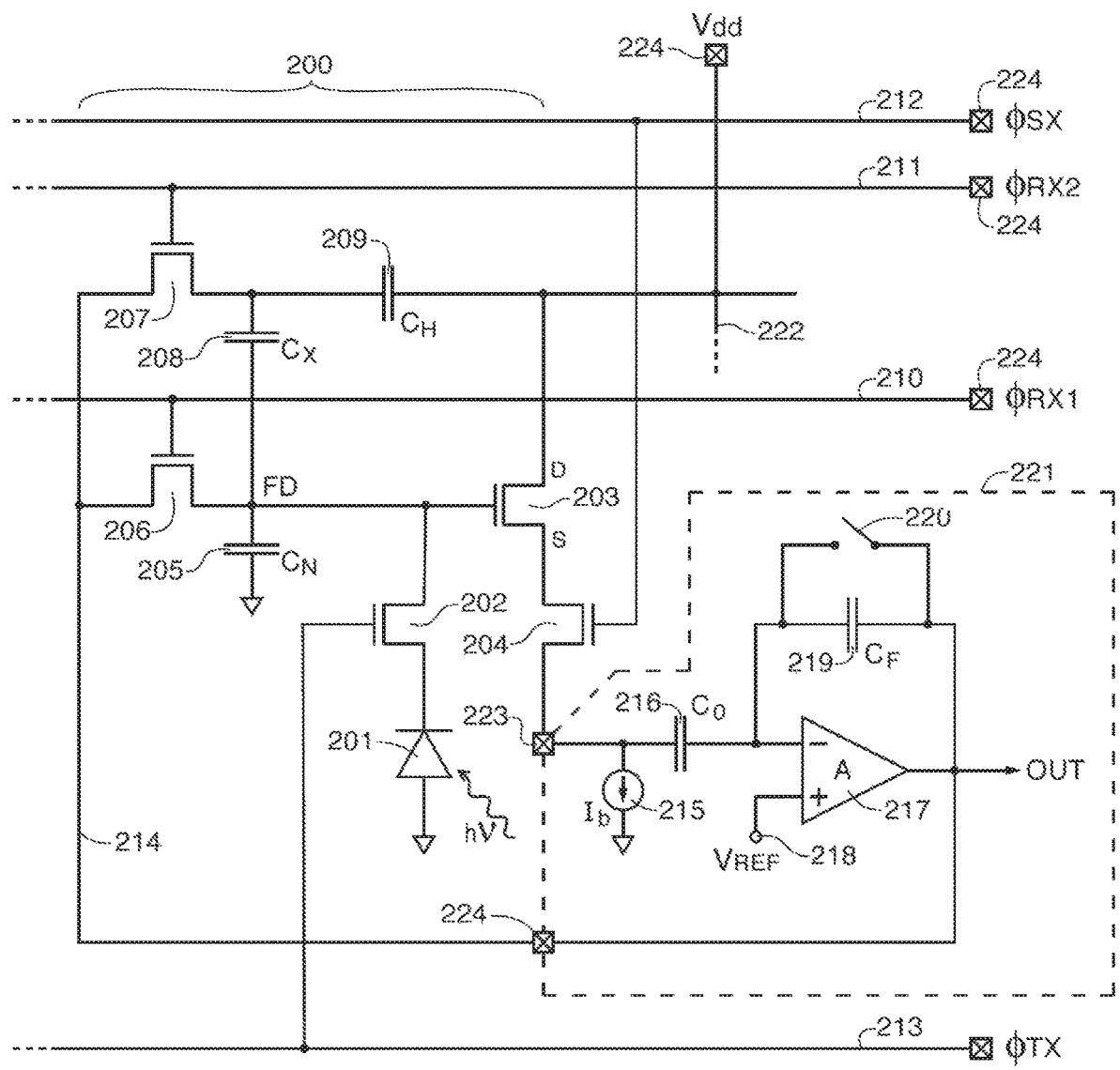
FIG. 2 is an illustrative circuit diagram of a global shutter image sensor pixel having a floating diffusion region, pixel column feedback, and a double floating diffusion reset for optimizing area, voltage swing, and efficiency while minimizing kTC noise generation relative to pixels of the type shown in FIG. 1 in accordance with an embodiment of the present invention.

A simplified circuit diagram of an illustrative global shutter image pixel is shown in FIG. 2. As shown in FIG. 2, pixel 200 may include a photodiode 201 that senses incoming light hv (e.g., light having frequency v) and converts the light to electric charge (e.g., that generates charge in response to image light). Photodiode 201 may be coupled to a charge detection node such as node 205 (e.g., represented by node capacitor 205 having capacitance $C_N$) through charge transferring transistor 202. Charge detection node capacitor 205 may, if desired, include one or more additional capacitors coupled to the node to increase the charge storage capacity of the node (e.g., one or more dual conversion gain capacitors, etc.). Node capacitor 205 may be coupled to the gate terminal of source follower transistor 203. Source follower 203 may have a drain terminal connected to drain column bus line 222 (e.g., the column line 222 on which bias voltage Vdd is received from via 224) and a source terminal coupled to column sense line 223 (sometimes referred to herein as read out line 223) through addressing transistor 204.

Charge detection node 205 (sometimes referred to herein as floating diffusion node 205, floating diffusion junction region 205, floating diffusion junction 205, charge storage node 205, charge storage region 205, or floating diffusion region 205, and which may be implemented (and as is represented in the schematic) as a capacitive element in or on a semiconductor pixel substrate or as a doped region of the semiconductor substrate) may be reset via reset transistor 206 to a reset reference voltage produced at the output of column amplifier 217 via column voltage reference line 214. Similarly, the second reset transistor 207 resets the holding capacitor 209 (having capacitance CH) to a reference voltage provided by amplifier 217 via column line 214. Row control circuitry (not shown) may generate row control signals for pixel 200 (e.g., charge transfer control signals, pixel reset control signals, addressing or row select control signals, etc.). For example, reset transistor 206 may receive reset control signals $\varphi_{RX1}$ over row control line 210 whereas reset transistor 207 may receive reset control signals $\varphi_{RX2}$ over row control line 211 (e.g., reset transistor 206 may reset node 205 and reset transistor 207 may reset holding capacitor 209 to a reset voltage as provided by the output of amplifier 217 when reset signals $\varphi_{RX1}$ and $\varphi_{RX2}$ are pulsed high, respectively). Addressing transistor 204 (sometimes referred to herein as row select transistor 204) may receive row select control signals $\varphi_{SX}$ via row control line 212 (e.g., row select control signals that are pulsed to select a desired row of pixels for read out (scanning)). Charge transfer resistor 202 may be controlled by charge transfer control signals $\varphi_{TX}$ received over row control line 213 (e.g., when control signal $\varphi_{TX}$ is pulsed, charge may be transferred from node photodiode 201 to node 205).

Pixel 200 may be formed in an array of image pixels arranged in rows and columns on a common image sensor semiconductor substrate (e.g., an integrated circuit substrate). Transistors such as transistors 206, 207, 203, and 202 of FIG. 2 may be formed on a first surface (front side) of the substrate. Image light may be received by photodiode 201 through a second surface (back side) of the substrate that opposes the first surface. Pixel 200 may thereby sometimes be referred to as a back side illuminated (BSI) image sensor pixel. BSI image sensor pixels may have improved quantum efficiency relative to front side illuminated (FSI) image sensor pixels, for example.

Pixels 200 in the array may be coupled to column feedback amplifier circuitry 221 (e.g., via readout path 223 and line feedback path 214). Column feedback amplifier circuitry 221 may be formed on a common semiconductor substrate (e.g., integrated circuit) as pixel 200 or may, if desired, be formed on a separate substrate from pixel 200 (e.g., a second integrated circuit chip to which the pixel array integrated circuit chip is attached). For example, amplifier 221 may be formed on a second substrate that is stacked vertically with respect to the substrate of pixel 200 (e.g., that is attached to the front side of the substrate on which pixel 200 is formed). The integrated circuit substrate on which pixels 200 are formed may be coupled to the integrated circuit substrate on which column amplifier circuitry 221 is formed by electrical interconnects such as through vias 224 (e.g., metal via extending between the integrated circuit substrates or through-silicon via extending through a common integrated circuit substrate from the pixel to the column amplifier circuitry in scenarios where pixels 200 and column amplifier circuitry 221 are formed on the same semiconductor substrate). Each pixel 220 in a selected row of the corresponding pixel array may be coupled to a corresponding amplifier circuit 221 at a given time (e.g., a number of amplifier circuits 221 may amplify signals from corresponding pixels of a first row of pixels while that row is selected, may subsequently amplify signals from a second row of pixels that is selected, etc.).

Amplifier circuitry 221 may include amplifier circuits such as operational amplifier 217, pixel current source bias generator 215, coupling capacitor 216 (e.g., having capacitance $C_O$) coupled between current source 215 and a first (negative) input of amplifier 217, and feedback capacitor 219 (e.g., having capacitance $C_F$) coupled between the first input of amplifier 217 and the output of amplifier 217. Amplifier 217 may have a second (positive) input coupled to reference voltage $V_{REF}$ received over terminal 218. Amplifier 217 may be reset using reset switch 220 coupled across feedback capacitor 219.

Pixel 200 and column amplifier circuitry 221 may perform double reset operations to mitigate reset noise such as kTC-reset noise. For example, pixel 200 may perform double reset operations using first reset transistor 206 and second reset transistor 207. First reset transistor 206 of a selected row of pixels 200 may be pulsed on and off (e.g., using reset signals provided by row control circuitry) while the second reset transistor 207 is held on and released only after an error correction signal corresponding to a first reset error is received from the amplifier 217. After completion of this double reset action, charge transfer transistor 202 is pulsed, transferring the sensed signal in a global transfer fashion of integrated charge from photodiodes 201 to node 205, and the transferred charge is sampled using CDS circuitry coupled to node 223 (not shown for the sake of simplicity). After sensing and processing the desired signal the node 205 may be reset again. This may remove signal charge from capacitor 205 while introducing kTC-reset noise on charge detection node 205. However, the feedback signal generated at the output of amplifier 217 may serve as a correcting voltage (e.g., a kTC-reset noise compensation voltage) that is stored on holding capacitor 209 (e.g., a capacitor having capacitance CH) while second reset transistor 207 is turned on (e.g., during the double reset operation). Second reset transistor 207 and holding capacitor 209 may each be coupled to charge detection node 205 via coupling capacitor 208 (e.g., a capacitor having capacitance CX). This process may compensate for kTC-reset noise error, depending on the values of the capacitances in pixel 200, may almost completely eliminate the kTC-reset noise error. Second reset transistor 207 may subsequently be turned off after the correcting voltage has been stored on holding capacitor 209. The holding capacitor 209 may be connected between the node 208 and $V_{dd}$ line node 222 or alternately between the node 208 and ground or any other suitable voltage reference node.

The kTC-reset error compensation voltage transferred to and held on holding capacitor 209 by this action may be negligible if holding capacitance $C_H$ is sufficiently large. The voltage at column sense line 223 after the reset operation is subsequently sensed and processed by the column CDS circuit (not shown). The CDS circuit may eliminate pixel fixed pattern noise that is generated by variations in the threshold voltage of the pixel source follower transistors and other variances in circuit component values of pixel 200. Amplifier circuit 217 may subsequently be reset to reference voltage $V_{REF}$ by pulsing reset switch 220 to short opposing sides of capacitor 219. This prepares amplifier circuitry 221 for sensing a signal from the next row of pixels in the pixel array, which may be initiated by turning on pixel row select transistors 204 in the next row of the array.

Figure 1:
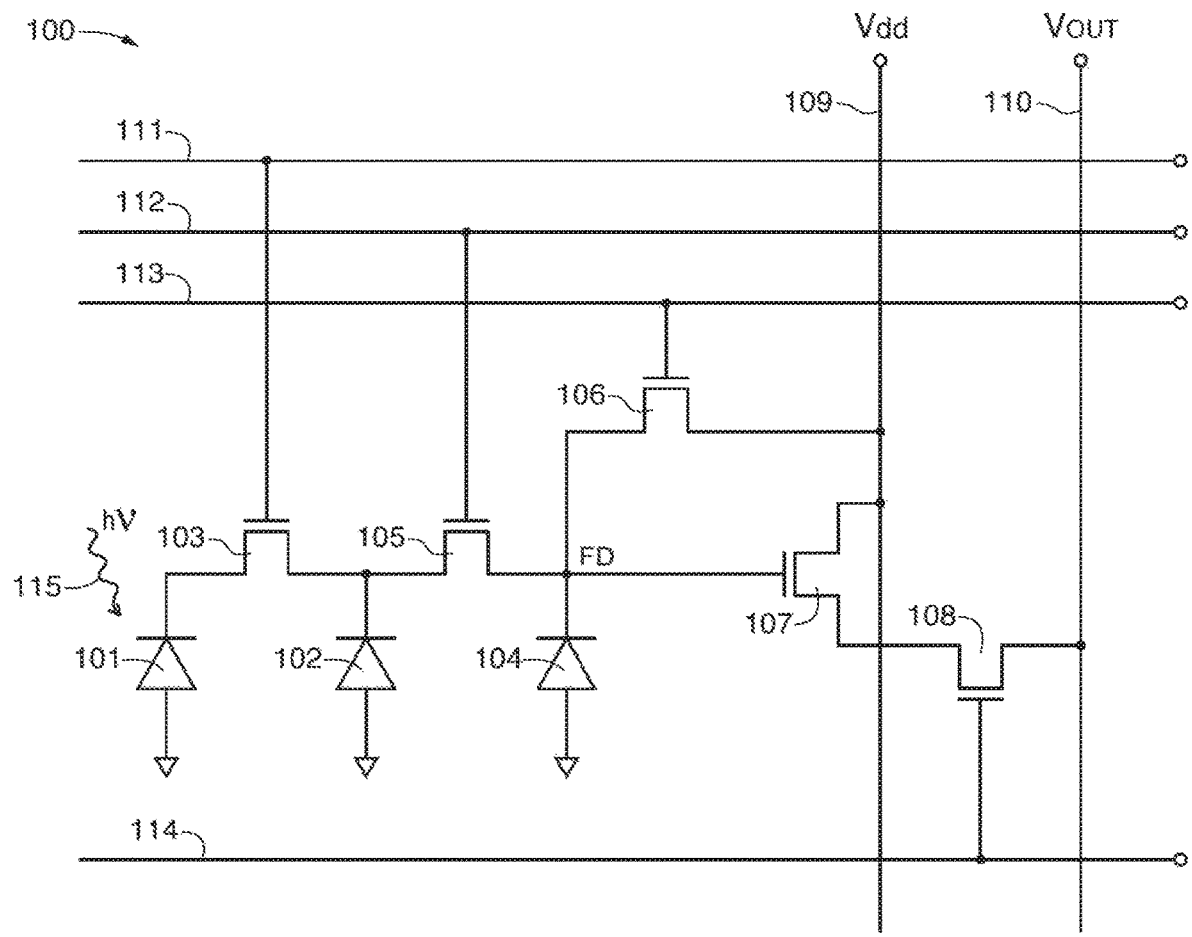
FIG. 1 is a simplified circuit diagram of a conventional global shutter image sensor pixel having a light sensing photodiode and a pinned diode for charge storage.

This example of FIG. 2 is merely illustrative. If desired, other timing variations may be applied to this readout sequence. For example, amplifier 217 may be reset at different times, which may be useful to simplify operation. If desired, amplifier 217 may be reconfigured to provide a different desired gain while the signal charge is present on the floating diffusion node (e.g., node 205). This type of arrangement may be advantageous when imaging low light level scenes, for example. Circuitry for performing amplifier gain reconfiguration on amplifier 217 has been omitted from FIG. 2 for the sake of simplicity. However, such reconfiguration may be performed by switching in various values of feedback capacitor 219 into and out of the feedback loop between the input and the output of amplifier 217. For example, amplifier 217 may be set to a first gain level (e.g., to provide a first desired gain to signals received from line 223) during a pixel reset interval (e.g., during which reset voltages are sampled from pixel 200) and may be set to a second gain level that is different from the first gain level during an image sampling interval (e.g., during which image level voltages corresponding to the image light captured by photodiode 201 are sampled from pixel 200). If desired, reference voltage $V_{REF}$ 218 may be changed in order to gain a wider voltage swing at the output of amplifier 217. For example, the magnitude of $V_{REF}$ may be set to a relatively high level during the reset and to a relatively low level during readout. In another suitable arrangement, reset transistor 206 may be connected to voltage $V_{dd}$ or may be connected to a separate reference bias line, whereas transistor 207 remains connected to column feedback line 214. Pixel 200 may be formed without any light shield (e.g., because a second pinned diode is not used to store charge as in FIG. 1) on the back side of the image sensor substrate and may exhibit relatively low dark current generation in the arrangement of FIG. 2 relative to the arrangement of FIG. 1.

Figure 3:
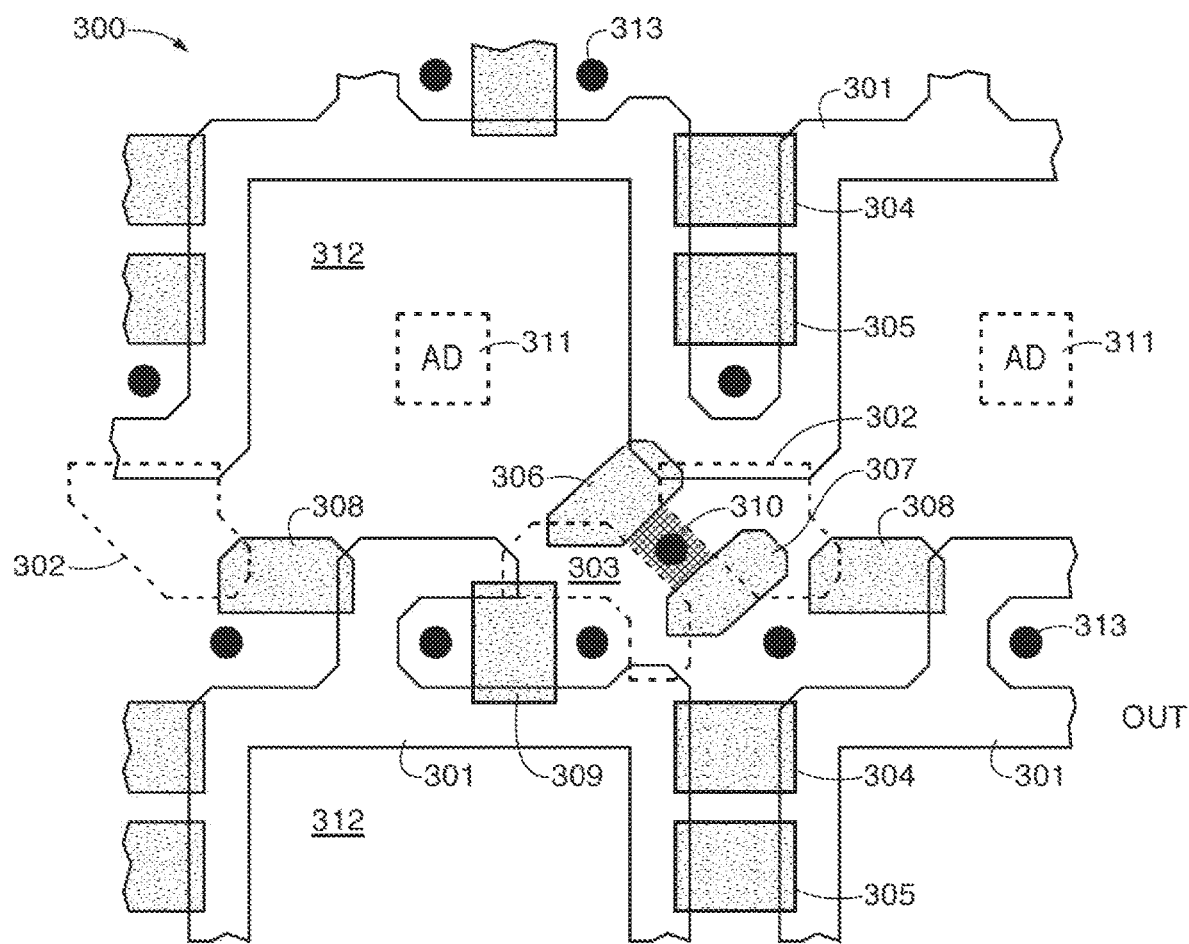
FIG. 3 is an illustrative layout of a global shutter image sensor pixel of the type incorporating a circuit shown in FIG. 2 having a floating diffusion node with a relatively small area on the pixel substrate, and with eliminated STI isolation in the vicinity of the floating diffusion node (e.g., to optimize area consumption by the charge storage regions in the pixel) in accordance with an embodiment of the present invention.

FIG. 3 is an illustrative diagram of the topology of a pixel such as pixel 200 as shown in FIG. 2. As shown in FIG. 3, pixel 300 (e.g., a pixel such as pixel 200 described in connection with FIG. 2) may include a shallow isolation trench (STI) pixel isolation region that separates the various active components of pixels 200 from one another and from neighboring pixels 300 in the array. STI region 301 may, if desired, surround active pixel regions in pixel 300 such as photodiode region 312 (e.g., corresponding to photodiode 201 of FIG. 2). Pixel 300 may include p-type doped regions (e.g., p+ type doped regions) 302 and 303 that provide isolation for floating diffusion region 310 (e.g., corresponding to floating diffusion node 205 of FIG. 2). Regions 302 and 303 may provide sufficient isolation for floating diffusion junction 310, comparable to that of STI region 301, which may be a possible source of high dark current generation if not adequately passivated. Floating diffusion 310 may thereby be bounded at the front (first) surface of the semiconductor substrate by only charge transfer transistor gate 306 (e.g., a gate of corresponding transfer transistor 202 of FIG. 2), first reset transistor gate 307 (a gate of corresponding reset transistor 206), and p+ type diffusion regions 302 and 303. In other words, p-type regions 302 and 303 may define two opposing sides of floating diffusion junction region 310 whereas gate 306 defines a third side and gate 307 defines a fourth side that opposes the third side of floating diffusion region 310 such that floating diffusion region 310 is surrounded at the front surface of the pixel substrate by regions 302 and 303 and gates 307 and 306. Contact holes (via) to the silicon active regions are indicated in FIG. 3 by black circles 313. Contact holes to the poly-silicon gates of FIG. 3 and metal interconnect layers formed on top of pixel surface 300 have been omitted for the sake of simplicity. Floating diffusion 310 may be sufficiently small such that region 310 has an area that is substantively equal to that of each contact 313. In this way, floating diffusion 310 may have a reduced area relative to the diodes of the type shown in FIG. 1 and relative to scenarios where diffusion 310 is surrounded by isolation regions 301. Floating diffusion region 310 and p-type isolation regions 302 and 303 may be suitably doped to minimize dark current generation. As shown in FIG. 3, floating diffusion region 310 may be relatively small compared to the total area of pixel 300. Region 310 may be implanted by a very shallow n+ type doped implant (e.g., at the front side of the pixel substrate) in order to capture a relatively small number of photons that impinge on pixel 300 from the back side of the pixel substrate. This may result in a desirably high shutter efficiency (e.g., without the need for light shields). In this way, floating diffusion region 310 may have a reduced area relative to the diodes of the type shown in FIG. 1 while also allowing for decreased dark current generation and optimized shutter efficiency. If desired, pixel 300 may include anti-blooming/reset transistor gate 308 and a potential profile adjustment Anti Dome (AD) implant region 311 (omitted from the schematic of FIG. 2 for the sake of simplicity). The remaining poly-silicon gates include the gate of source follower transistor 304, the gate of row select transistor 305, and second reset transistor gate 309 (e.g., a gate portion of corresponding reset transistor 207 of FIG. 2). If desired, the array of pixels 300 may include dark current reference pixels (e.g., pixels used to compensate for dark current in the array) located at the periphery of the array. The dark current reference pixels may include the same floating diffusion regions as the pixels 300 in the main sensing body of the array, but may be formed without photodiode regions 312. If dark reference pixels are sufficiently removed from the array, a light shield may be formed over the dark reference pixels to shield from impinging light.

Pixels with the circuit such as described in FIG. 2 and with a pixel topology 300 described in FIG. 3 may be used in a global shutter imaging scheme and may exhibit relatively high global shutter efficiency, relatively low dark current generation, and relatively small size compared to conventional global shutter image pixels. Pixels described in drawings 200 and 300 may be illuminated from the back side of the image pixel substrate without using a light shield (with thereby optimized shutter efficiency) and may, if desired, be stacked with respect to other integrated circuit chips and may be connected to those integrated circuit chips by chip-to-chip interconnects located at the periphery of the array.

Figure 4:
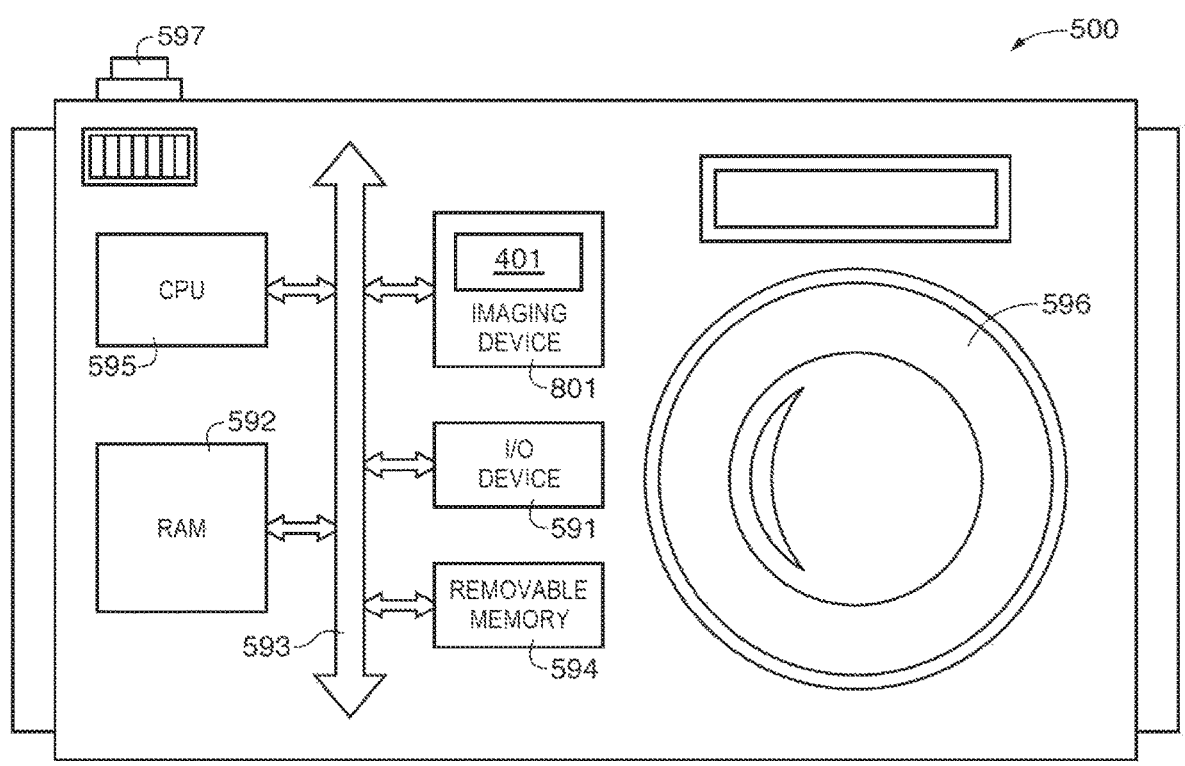
FIG. 4 is a block diagram of a processor system employing the image sensor pixels of FIGS. 2 and 3 in accordance with an embodiment of the present invention.

FIG. 4 shows in simplified form a typical processor system 500, such as a digital camera, which includes an imaging device such as imaging device 801 (e.g., an imaging device 801 such as an image sensor that includes the backside illuminated global shutter pixels with reduced area and dark current generation as described above in connection with FIGS. 2 and 3). Processor system 500 is exemplary of a system having digital circuits that could include imaging device 801. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 500, which may be a digital still or video camera system, may include a lens such as lens 596 for focusing an image onto a pixel array when shutter release button 597 is pressed. Processor system 500 may include a central processing unit such as central processing unit (CPU) 595. CPU 595 may be a microprocessor that controls camera functions and one or more image flow functions and communicates with one or more input/output (I/O) devices 591 over a bus such as bus 593. Imaging device 801 may also communicate with CPU 595 over bus 593. System 500 may include random access memory (RAM) 592 and removable memory 594. Removable memory 594 may include flash memory that communicates with CPU 595 over bus 593. Imaging device 801 may be combined with CPU 595, with or without memory storage, on a single integrated circuit or on a different chip. Although bus 593 is illustrated as a single bus, it may be one or more buses or bridges or other communication paths used to interconnect the system components.

Various embodiments have been described illustrating a back side illuminated imaging system (e.g., image sensor pixel array) that can operate in a global shutter mode with improved shutter efficiency, reduced dark current generation, and optimized semiconductor substrate area consumption relative to conventional global shutter image sensor pixel arrays. The image sensor pixel array may include image sensor pixel circuitry that includes a substrate having opposing front and back surfaces. The image sensor pixel array may be illuminated with image light through the back surface.

The image sensor pixel array may include a number of image sensor pixels each having a photodiode that generates charge in response to image light (received through the back surface). A floating diffusion node (region) may be coupled to the photodiode through a charge transfer transistor that is configured to transfer the generated charge from the photodiode to the floating diffusion node when pulsed by row control circuitry coupled to the array. First and second reset transistors may be coupled to the floating diffusion node and the error voltage holding capacitor node and may reset the floating diffusion node when pulsed by the row control circuitry. A source follower transistor may have a gate terminal coupled to the floating diffusion node, a source terminal coupled to a pixel addressing (row select) transistor, and a drain terminal coupled to a bias line. Each pixel may be coupled to a corresponding feedback amplifier circuit via a column readout line and a column feedback line. The column readout line may be coupled between the pixel addressing transistor and an input of the feedback amplifier circuit.

The feedback amplifier circuit may provide a reset voltage (e.g., a kTC-reset noise compensation voltage) to the first and second reset transistors over the column feedback line. The second reset transistor may be coupled to the floating diffusion node through a coupling capacitor whereas the first reset transistor may be coupled directly to the floating diffusion node. A holding capacitor may be coupled between the coupling capacitor and the drain terminal of the source follower transistor. The holding transistor may store the kTC-reset noise compensation voltage from the output of the feedback amplifier when the second reset transistor is turned off.

The image sensor pixels in the array may be formed on a common semiconductor substrate having front and back sides. The transistors may be formed at the front side and interconnect layers may be formed over the front side. The feedback amplifier circuitry may be formed in the same substrate as the pixel array or in a separate semiconductor substrate coupled to the front side of the pixel substrate by the interconnect layers and via. P-type doped semiconductor regions may be formed in the pixel array substrate at the front surface such that the p-type doped regions, the first reset transistor gate, and the charge transfer transistor gate surround and bound the floating diffusion node at the front side (e.g., define each of the edges of the floating diffusion node). In this way, STI regions may be omitted for isolating the floating diffusion node, thereby reducing the area required for the floating diffusion node while also reducing dark current generation and optimizing the shutter efficiency in the imaging system.

The pixel array may be operable in a global shutter mode in which charge is transferred by every pixel in the array from the corresponding photodiode to the corresponding floating diffusion region at once (thereby preventing rolling shutter artifacts in the captured image). The global shutter image pixels having improved area, shutter efficiency, and dark current generation, and may be formed in a system having a central processing unit, memory, input-output circuitry, and a lens for focusing light onto the array.

The foregoing is merely illustrative of the principles of this invention and various modifications can be made by those skilled in the art without departing from the scope and spirit of the invention. The foregoing embodiments may be implemented individually or in any combination.

What is claimed is:

1. An imaging system comprising:
   a floating diffusion node that receives charge generated in response to light;
   a source follower having a gate terminal coupled to the floating diffusion node;
   an amplifier having an input and an output;
   an addressing transistor coupled between the source follower and the input of the amplifier;
   a first transistor and a second transistor, wherein the first transistor has a first terminal, a second terminal, and a gate terminal, wherein the first terminal is coupled to the floating diffusion node, and wherein the second terminal is shorted to the second transistor;
   a first capacitor coupled between the second transistor and the floating diffusion node; and
   a conductive path coupled between the output of the amplifier and the second transistor.

2. The imaging system defined in claim 1, wherein the source follower has a source terminal and a drain terminal and the source terminal is coupled to the addressing transistor.

3. The imaging system defined in claim 2, wherein the drain terminal is coupled to a voltage source.

4. The imaging system defined in claim 1, further comprising:
   a circuit node coupled between the first capacitor and the second transistor;
   a voltage source; and
   a second capacitor coupled between the circuit node and the voltage source.

5. The imaging system defined in claim 4, wherein the amplifier is configured to generate a noise correcting signal at the output and to provide the noise correcting signal to the first and second transistors over the conductive path.

6. The imaging system defined in claim 5, wherein the second transistor is configured to transfer the noise correcting signal from the conductive path to the circuit node and wherein the second capacitor is configured to store the noise correcting signal.

7. The imaging system defined in claim 1, wherein the gate terminal of the first transistor receives a first control signal and wherein the second transistor has a gate terminal that receives a second control signal that is different from the first control signal.

8. The imaging system defined in claim 7, wherein the addressing transistor has a gate terminal that receives a third control signal that is different from the first and second control signals.

9. The imaging system defined in claim 1, wherein the input of the amplifier comprises a positive input and a negative input, wherein the negative input is coupled to the addressing transistor, and wherein the positive input is coupled to a reference voltage.

10. An imaging system comprising:
    a floating diffusion node that receives charge generated in response to light;
    a source follower having a gate terminal coupled to the floating diffusion node;
    an amplifier having an input and an output;
    an addressing transistor coupled between the source follower and the input of the amplifier;
    a reset transistor, wherein a circuit node is coupled between the reset transistor and the floating diffusion node;
    a voltage source;
    a capacitor coupled between the voltage source and the circuit node; and
    a conductive path coupled between the output of the amplifier and the reset transistor.

11. The imaging system defined in claim 10, wherein the amplifier is configured to generate a noise compensation signal at the output and to provide the noise compensation signal to the reset transistor over the conductive path.

12. The imaging system defined in claim 11, wherein the reset transistor is configured to transfer the noise compensation signal to the circuit node and the capacitor is configured to store the noise compensation signal.

13. The imaging system defined in claim 12, wherein the amplifier circuitry has an additional input that is coupled to a reference voltage.

14. An imaging system comprising:
    a floating diffusion node that receives charge generated in response to light;
    a source follower having a gate terminal coupled to the floating diffusion node;
    an amplifier having an input and an output, wherein the amplifier is configured to output a reset signal;
    an addressing transistor coupled between the source follower and the input of the amplifier;
    a first transistor and a second transistor, wherein the first transistor is coupled to the floating diffusion node and wherein the first transistor is configured to drive the floating diffusion node with the reset signal while the second transistor is turned on;
    a conductive path that is coupled between the output of the amplifier and the second transistor and that conveys the reset signal; and a first capacitor coupled between the second transistor and the floating diffusion node.

15. The imaging system defined in claim 14, wherein the second transistor has a gate terminal and first and second terminals, and wherein the first terminal is coupled to a circuit node and the second terminal is coupled to the conductive path.

16. The imaging system defined in claim 15, wherein the gate terminal of the second transistor receives a first control signal and a gate terminal of the first transistor receives a second control signal that is different from the first control signal.

17. The imaging system defined in claim 16, wherein the second control signal is configured to turn off the first transistor after the floating diffusion node has been driven with the reset signal.

18. The imaging system defined in claim 17, wherein the amplifier is further configured to output a noise compensation signal, the image sensor further comprising:
   a second capacitor coupled to the second transistor, wherein the second transistor is configured to drive the second capacitor with the noise compensation signal after the first transistor has been turned off.

19. The imaging system defined in claim 18, wherein the second transistor is configured to be turned off after the noise compensation signal has been stored on the second capacitor.

20. The imaging system defined in claim 14, further comprising:
   a voltage source; and
   a second capacitor interposed between the floating diffusion node and the voltage source.

* * * * *